United States Patent
Iggulden

(12)
(10) Patent No.: US 6,415,023 B2
(45) Date of Patent: *Jul. 2, 2002

(54) METHOD AND APPARATUS FOR SETTING PROGRAMMABLE FEATURES OF AN APPLIANCE

(75) Inventor: Jerry Iggulden, Santa Clarita, CA (US)

(73) Assignee: PointSet Corporation, Los Angeles, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/235,709

(22) Filed: Jan. 22, 1999

(51) Int. Cl.[7] .............................................. H04M 11/00
(52) U.S. Cl. ............................ 379/102.03; 379/102.01; 379/102.03; 379/93.17
(58) Field of Search ....................... 379/102.01, 102.02, 379/102.03, 102.05, 102.07; 345/166, 175, 329, 970; 709/220, 221, 222, 217, 218

(56) References Cited

U.S. PATENT DOCUMENTS

| | | |
|---|---|---|
| 3,407,301 A | 10/1968 | Kovanic |
| 3,737,566 A | 6/1973 | Baer et al. |
| 3,993,861 A | 11/1976 | Baer |
| 4,034,362 A | 7/1977 | Balanca et al. |
| 4,329,684 A | 5/1982 | Monteath et al. |
| 4,807,031 A | 2/1989 | Broughton et al. |
| 4,962,522 A | 10/1990 | Marian |
| 4,999,617 A | 3/1991 | Uemura et al. |
| 5,153,568 A | 10/1992 | Shaw |
| 5,228,077 A | 7/1993 | Darbee |
| 5,231,488 A | 7/1993 | Mohrbacher et al. |
| 5,268,995 A | 12/1993 | Diefendorff et al. |
| 5,309,509 A * | 5/1994 | Coklin et al. ............... 379/165 |
| 5,333,054 A | 7/1994 | Tanaka et al. |
| 5,347,110 A | 9/1994 | Audebert et al. |

(List continued on next page.)

FOREIGN PATENT DOCUMENTS

| | | |
|---|---|---|
| EP | 0803808 | 4/1997 |
| WO | WO 97/18636 | 5/1997 |
| WO | WO 97/30375 | 8/1997 |
| WO | WO 98/98570 | 9/1998 |

OTHER PUBLICATIONS

WO98/38570; Mtethods and apparatus for programming a device with a software package, Sep. 3, 1998.*

NBX Corporation, *Product Solutions; NBX NetSet Application Notes; NBX NetSett™ Administration Utility*, website printout, Dec. 14, 1998.

Microsoft Corporation, *Setting Up Your Microsoft Cordless Phone is Easy*, website printout, Dec. 15, 1998.

Shear, D., *Going Global in the Real World: Putting an Embedded System on the Internet*, EDN Electrical Design News, US, Cahners Publishing Co., Newton, Massachusetts, vol. 42, No. 19, Sep. 12, 1997, pp. 37–46.

Primary Examiner—Stella Woo
Assistant Examiner—Melur Ramakrishnaiah
(74) Attorney, Agent, or Firm—Blakely, Sokoloff, Taylor & Zafman LLP

(57) ABSTRACT

An interactive interface facilitates the setting of preferences and other programmable parameters of an appliance. The interface is hosted by a server on a global computer network. The appliance owner initiates a connection to the server and is presented with a graphical user interface for setting the preferences and features of the appliance. Once the desired settings have been made, they are downloaded to the appliance either directly from the server or the appliance owner's computer or indirectly using a portable transfer device.

7 Claims, 2 Drawing Sheets

U.S. PATENT DOCUMENTS

| | | |
|---|---|---|
| 5,410,326 A | 4/1995 | Goldstein |
| 5,414,756 A | 5/1995 | Levine |
| 5,488,571 A | 1/1996 | Jacobs et al. |
| 5,521,966 A | 5/1996 | Friedes et al. |
| 5,528,740 A | 6/1996 | Hill et al. |
| 5,535,147 A | 7/1996 | Jacobs et al. |
| 5,553,123 A | 9/1996 | Chan et al. |
| 5,570,297 A | 10/1996 | Brzezinski et al. |
| 5,592,188 A | 1/1997 | Doherty et al. |
| 5,594,493 A | 1/1997 | Nemirofsky |
| 5,600,711 A | 2/1997 | Yuen |
| 5,636,994 A | 6/1997 | Tong |
| 5,652,602 A | 7/1997 | Fishman et al. |
| 5,726,645 A | 3/1998 | Kamon et al. |
| 5,734,363 A | 3/1998 | Blouin et al. |
| 5,745,068 A | 4/1998 | Takahashi et al. |
| 5,746,602 A | 5/1998 | Kikinis |
| 5,748,895 A | 5/1998 | Shiff et al. |
| 5,752,880 A | 5/1998 | Gabai et al. |
| 5,761,601 A | 6/1998 | Nemirofsky et al. |
| 5,767,896 A | 6/1998 | Nemirofsky |
| 5,774,063 A | 6/1998 | Berry et al. |
| 5,781,125 A | 7/1998 | Godau et al. |
| 5,805,443 A * | 9/1998 | Raffray et al. ............... 364/140 |
| 5,815,086 A | 9/1998 | Ivie et al. |
| 5,819,294 A | 10/1998 | Chambers |
| 5,850,304 A | 12/1998 | Elmers et al. |
| 5,852,615 A | 12/1998 | Holo et al. |
| 5,873,765 A | 2/1999 | Rifkin et al. |
| 5,880,769 A | 3/1999 | Nemirofsky et al. |
| 5,905,486 A * | 5/1999 | Brittenham et al. ........ 345/157 |
| 5,907,350 A | 5/1999 | Nemirofsky |
| 5,953,047 A | 9/1999 | Nemirofsky |
| 6,049,778 A | 4/2000 | Walker et al. |
| 6,112,127 A * | 8/2000 | Bennett ..................... 700/86 |
| 6,157,982 A * | 12/2000 | Deo et al. .................. 709/212 |
| 6,161,133 A * | 12/2000 | Kikniis ...................... 709/220 |

* cited by examiner

METHOD AND APPARATUS FOR SETTING PROGRAMMABLE FEATURES OF AN APPLIANCE

BACKGROUND OF THE INVENTION

1. Field of the Invention

This invention relates generally to the field of setting programmable features of an appliance. More particularly, the invention provides a method and apparatus for conveniently setting various programmable features of an appliance using a graphical user interface accessed with a computer via a global computer network.

2. Prior Art

The advent of microprocessors and other miniaturized electronics has facilitated the implementation of increasingly complex functions in home and office appliances. Typically, a relatively complex operator interface is required in order to invoke the various functions that are available. For example, home electronic devices such as televisions, VCRs, stereo receivers and the like are typically provided with sophisticated remote control devices. Such remote control devices have a large number of individual buttons that are used to directly control features of an appliance and/or that are used to navigate through on-screen menus. Due to the sophistication and complexity of the controls, owner's manuals for appliances are becoming increasingly voluminous and difficult to comprehend.

Due to the growing complexity of modem appliances, many of the available features are never utilized by consumers, even as competition in the marketplace drives the proliferation of such features. A number of solutions have been proposed for making appliances easier to control and generally more "user friendly". For example, U.S. Pat. No. 5,553,123 issued to Chan, et al. discloses a method for downloading set-up data via a telephone to an appliance controller. A user first initiates a telephone call to a remote site having a computer. The user communicates certain background information to the remote site, and set-up data is then downloaded via the telephone connection. The earpiece of the telephone is held in proximity to a microphone built into the appliance controller in order to receive the downloaded data. Upon receipt of the data, the controller is configured to operate the appliance.

U.S. Pat. No. 5,600,711 issued to Yuen discloses an apparatus and methods for providing initializing settings to an appliance. When a user wishes to initialize the settings of an appliance, the user initiates a telephone connection with a remote site. The remote site then downloads a sequence of commands for initializing the settings in the appliance over the telephone connection. A remote control device for the appliance receives the sequence of commands and stores them in an internal memory. The remote control device is then aimed at the appliance and the user enters a command to transfer the stored sequence of commands to the appliance, thereby initializing the settings.

U.S. Pat. No. 5,141,756 issued to Levine discloses a method of initializing a programmable control device, such as a remote controller for a video cassette recorder. The device is programmed by connecting it to a telephone system, dialing a remote initializing center preferably employing a computer, and providing the computer with information as to the environment of the control device by using touch tone keys to respond to audio inquiries transmitted by the computer. The computer then transmits the initializing program for loading into the memory of the control device.

U.S. Pat. No. 5,774,063 issued to Barry, et al. discloses a method and apparatus for remote control of electronic devices from a computer. A transducer, such as an infrared transmitter, is coupled to a computer and aimed at an electronic device to be controlled. An application program running on the computer generates appropriate signals for control of the electronic device.

U.S. Pat. No. 5,815,086 issued to Ivie, et al. discloses a method and apparatus for communicating commands to electrical appliances from remote locations. Various appliances within a structure, such as a house, are coupled to a signal-conducting bus, such as the AC power wiring bus of the structure. Appliance commands are issued over the bus from a central transmitter. Appliances may be directly coupled to the bus or may receive commands via an infrared signal from an infrared transmitting device coupled to the bus. A handheld control device may be supplied for controlling the various appliances, in which case, receivers for the handheld control device are coupled to the bus in various parts of the structure.

U.S. Pat. No. 5,819,294 issued to Chambers discloses a programmable universal remote controller. A programming device is coupled to a computer and receives signals from conventional remote controllers. The programming device correlates the received signals with a database of stored signals used by various appliance manufacturers. The programming device then sends a complete set of appropriate control signals to the programmable universal controller.

U.S. Pat. No. 5,228,077 issued to Darbee discloses a universal remote controller that may be programmed from a remote location. The remote controller receives programming data via a video or telephonic data transmission system.

U.S. Pat. No. 5,488,571 issued to Jacobs, et al. discloses a system for transferring data from a video display monitor of a personal computer to a portable information device such as an appointment scheduling device. The video display is modulated to transmit data to an opto-electronic receiver in the portable information device.

Microsoft Corporation has introduced a cordless phone having programmable functions controlled by a personal computer. The base station of the phone is coupled to the serial port of a computer and application software is installed on the computer to control operation of the phone.

SUMMARY OF THE INVENTION

The present invention provides methods and apparatus for setting preferences and other parameters of an appliance. In preferred embodiments of the invention, a user initiates a connection to an interactive site on a global computer network. The site hosts a graphical user interface with which preferences and other parameters of an appliance may be set by the user. In some embodiments, set-up data for the appliance is downloaded from the user's computer or the interactive site directly to the appliance. In other embodiments, set-up data for the appliance is downloaded from the user's computer or the interactive site to a transfer device where it is temporarily stored. The transfer device, which is easily portable, is taken by the user to the appliance, and the set-up data is downloaded from the transfer device to the appliance. Since the appliance itself does not require a user interface for set-up procedures and programming, the appliance can be smaller, cheaper and lighter without sacrificing any functionality. In addition, the need for a printed user's manual is largely obviated since all of the information normally contained in such a manual can be obtained from the interactive site.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

The present invention finds application with a wide variety of home and office appliances. Some categories of appliances in which the invention may be utilized include telephones, televisions, video recorders, audio and video entertainment system components, refrigerators, conventional ovens, microwave ovens, dishwashers, irrigation systems, global positioning satellite (GPS) receivers, automobile heating, ventilating and air conditioning (HVAC) systems, automobile sound systems, home security systems, home HVAC systems, home master control systems, facsimile machines, copiers, postage meters, etc. "Programmable features" refer to any appliance features that may be altered. These include, for example, initialization or set-up parameters, stored data (e.g., telephone speed dial numbers or GPS receiver database) and internal software. Specific examples are given below to illustrate operation of the invention. However, it will be understood that the invention has general applicability to appliances of all types and to all types of programmable features within such appliances.

Figure 1:
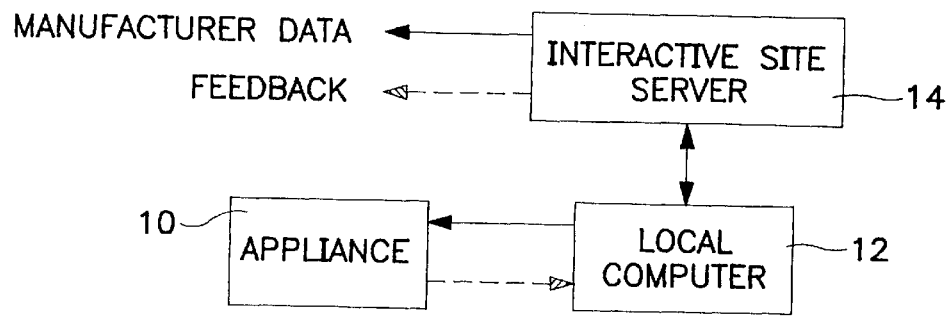
FIG. 1 is a functional block diagram of a first embodiment of the invention wherein an appliance receives data directly from a local computer.

A first embodiment of the invention is illustrated in FIG. 1. An appliance 10 receives set-up data from a local computer 12. In a typical application, local computer 12 is a general purpose personal computer of the type now widely found in homes and offices. Details of computer 12 are not particularly relevant to the invention and are not shown. Typically, computer 12 will comprise, at a minimum, a processing unit, a keyboard and a display. Additional input devices, such as a mouse or other pointing device, and output devices, such as a printer, may also be included as part of computer 12.

Local computer 12 is coupled to a remote interactive site server 14 by a telecommunications link. In a typical embodiment of the invention, interactive site server 14 would be accessible via the World Wide Web. Other appropriate means for connecting computer 12 to server 14 could also be employed. Server 14 contains programming for interactively setting the programmable features of appliance 10. Preferably, server 14 presents to the owner of appliance 10, via computer 12, a graphical user interface that is tailored to appliance 10 and the programmable features thereof. Such interface can be thought of as a "virtual appliance". This can be better understood from the discussion of FIG. 4, below.

In the embodiment illustrated in FIG. 1, appliance 10 is directly coupled to local computer 12. The connection between appliance 10 and computer 12 may be one-way from the computer or two-way. One-way communication may be accomplished optically by modulating the display of computer 12 as is known in the art. Other communication techniques can be employed using audio, magnetic, inductive, infrared, or radio frequency coupling. Two-way communications are most conveniently established by connection to a serial port of computer 12. Naturally, this type of connection is not convenient for some appliances, but is particularly well-suited to portable appliances that may require a large amount of data. For example, loading data into a pocket organizer or similar type of personal-digital assistant can be most conveniently accomplished with a serial port connection in the configuration illustrated in FIG. 1.

In order to provide the appropriate interface for programming the features of appliance 10, server 14 preferably receives data from the appliance manufacturer. Such data may be received periodically as new model appliances are released by the manufacturer or may be obtained by server 14 in real time with a dial-up connection to the manufacturer. The latter approach offers the advantage of insuring that the most recent product information is available to server 14. One method of insuring that the appropriate information for appliance 10 is obtained by server 14 is to prompt the appliance owner to input the serial number of the appliance at computer 12. This need only be performed once, since the serial number can thereafter be stored in computer 12 and/or server 14 for use in subsequent programming of the same appliance.

An optional aspect of the invention is the ability of server 14 to provide valuable feedback to the appliance manufacturer. During appliance set-up operations, server 14 collects information concerning consumer's use of product features that can be useful in product marketing and new product design. The link between server 14 and the appliance manufacturer also facilitates new marketing opportunities. The manufacturer can readily target advertising to identified purchasers of its products. Also, the manufacturer can offer accessories and related products for appliance 10. Such offers may be integrated with the set-up interface or may be directed to the appliance owner separately by email or conventional mail. It should be appreciated that the invention can facilitate warranty registration. Since the appliance owner is already communicating with server 14 to set programmable features of the appliance, it is a simple matter to collect the additional information necessary to complete warranty registration and, if desired, to provide additional demographic data to the manufacturer.

Figure 2:
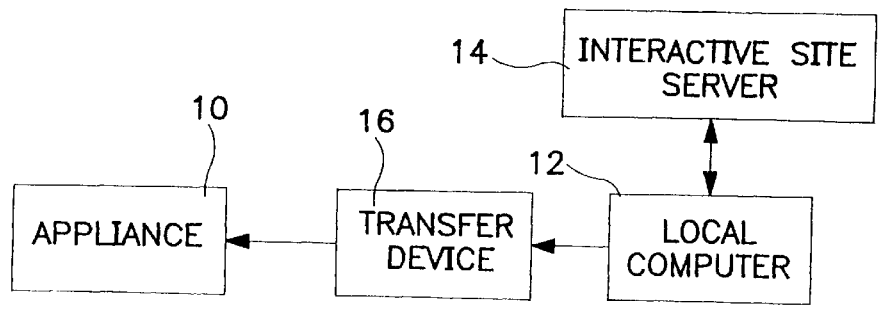
FIG. 2 is a functional block diagram of a second embodiment of the invention wherein an appliance receives data from a local computer via a transfer device.

FIG. 2 illustrates an alternative embodiment of the invention. This embodiment is similar to that of FIG. 1, except that programming data is provided to appliance 10 by a transfer device 16. This transfer device receives the programming data from local computer 12 by a wired connection to computer 12 or, preferably, by an opto-electronic or other wireless data link.

Figure 3:
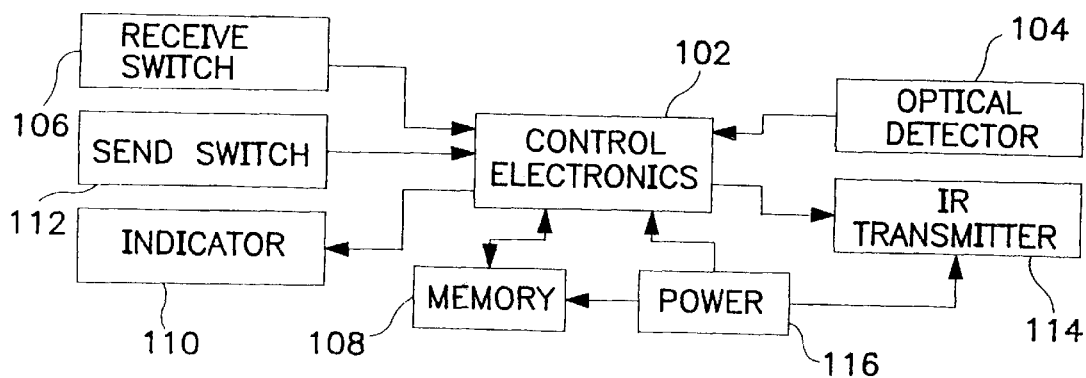
FIG. 3 is a functional block diagram of a transfer device as shown in FIG. 2.

FIG. 3 is a functional block diagram of a suitable transfer device 16. At the heart of device 16 is a control electronics module 102. Data modulated on the display screen of computer 12 is sensed by optical detector 104 upon activation of receive switch 106. The data is demodulated by electronics 102 and is stored in memory 108. Upon confirmation of error-free transfer and storage of the data, a suitable indication is provided to the user by means of indicator 110, which may be, for example, a light emitting diode (LED). With the data loaded in memory 108, transfer device 16 may be carried to appliance 10, which preferably includes an infrared receiver coupled to its internal control electronics. Transfer device 16 is held in proximity to the infrared receiver of appliance 10. Upon actuation of transmit switch 112, the data stored in memory 108 is appropriately modulated by electronics 102 and applied to infrared transmitter 114. Indicator 110 may confirm to the user that the data has been transmitted. Alternatively, or in addition, an indicator may be provided on appliance 10 to signal receipt of the data. Power source 116, preferably in the form of common alkaline battery cells, provides electrical power to the components of device 16.

Transfer device 16 may be configured in various forms. Preferably, device 16 is easily portable. Device 16 may be in the form of a pen or wand with optical detector 104 and infrared transmitter 114 at one end. Transfer device 16 may also be integrated with a conventional remote controller for those types of appliances that are commonly controlled remotely. In another variation, transfer device 16 may be a removable module of appliance 10. In such case, communication between the transfer device and the appliance may be accomplished with a direct electrical connection through a suitable arrangement of electrical contacts. Transfer device 16 may, in fact, comprise the "brains" of appliance 10 in the form of a microprocessor or equivalent device. Aside from the ease of programming features and functions of the appliance, such an arrangement offers the added benefit of facilitating service or replacement of the appliance's electronic components in the event of malfunction.

Figure 4:
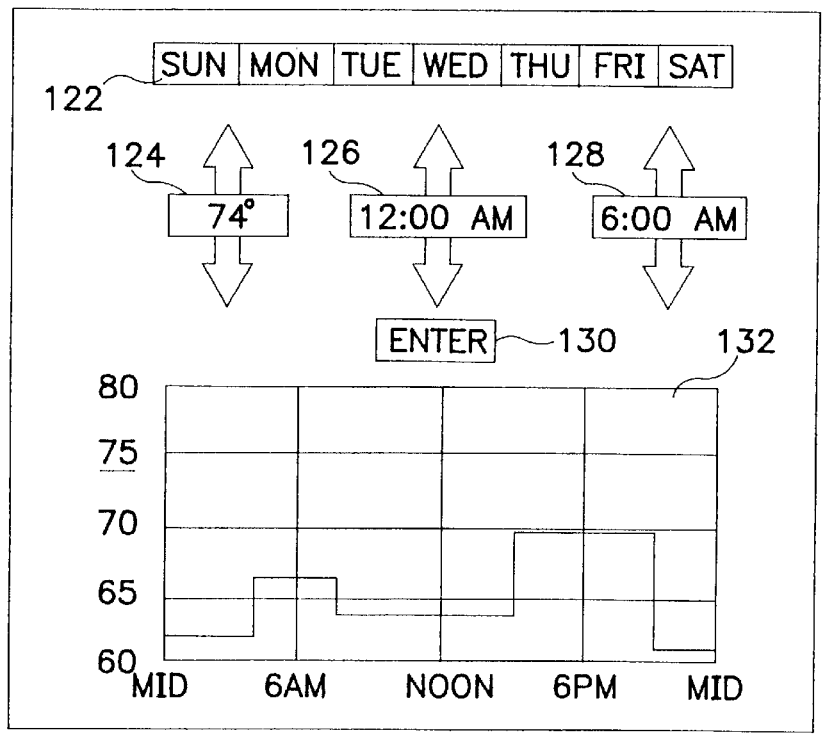
FIG. 4 illustrates a graphical user interface suitable for setting programmable features of a thermostat.

The embodiment shown in FIGS. 2 and 3 is particularly well-suited to appliances that are relatively fixed in position and that require only limited amounts of data. Examples of such appliances abound in the home and office. One such example is a thermostat for a home HVAC system. FIG. 4 illustrates a graphical user interface for a thermostat as presented on a display of computer 12. Such interface is shown merely for purposes of illustration, it being understood that the particular features of the interface are largely a matter of design choice.

Along the top of the display shown in FIG. 4 is a day strip 122. The user may select any one of the days with a cursor to program the thermostat settings for that day. Below the day strip is a temperature selector 124. Pointing at the up or down arrow with a mouse or other cursor positioning device, the user selects the desired temperature. To the right of temperature selector 124 there are a pair of time windows 126 and 128. Using the appropriate up and down arrows, the user selects the starting and ending times for which the temperature selection applies.

When the desired settings have been made, the user selects ENTER button 130 to store the selections and then proceeds to make the next set of selections. For convenience, the ending time last entered may be automatically inserted into the starting time window. A graphical display 132 of the selected temperature profile may be provided for the user's convenience.

When all settings have been completed, the data is loaded into transfer device 16, which is then taken to the physical location of the thermostat for transfer of the data. Since all of the settings have been entered into computer 12, they may conveniently saved locally and/or by server 14 for subsequent use in revising these settings or for reloading the settings in the event of a power failure. A printed record of the settings may also be made from computer 12. For some appliances, a print-out following a set-up procedure may be used as a template for the appliance to indicate selected options and programmed features. For example, certain appliances may have unlabeled function buttons for which a template may be made once selected functions have been assigned to the buttons during a set-up procedure.

It will be appreciated that a thermostat physically incorporating the interface shown in FIG. 4 would be quite large and costly in comparison to conventional thermostats. This is due primarily to the relative complexity of the interface, since the actual componentry to provide such flexibility of thermostat settings is actually quite small and inexpensive. Through use of the present invention, virtually unlimited flexibility in thermostat programming may be accomplished with a thermostat that is no larger and no more costly than a conventional thermostat. Indeed, a thermostat as just described could easily be made the size of a postage stamp.

Figure 5:
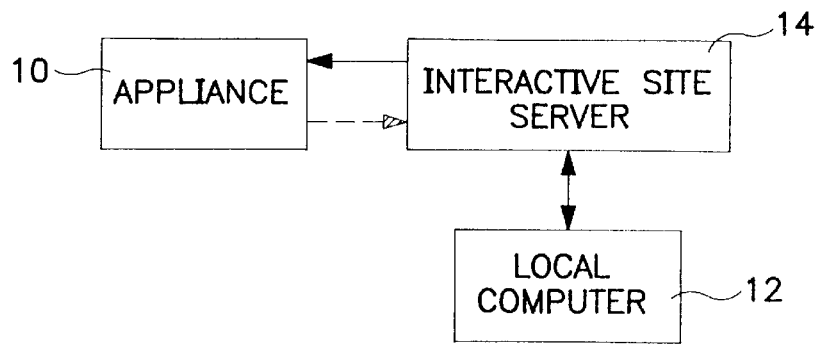
FIG. 5 is a functional block diagram of a third embodiment of the invention wherein an appliance receives data directly from an interactive site server.

FIG. 5 illustrates another alternative embodiment of the invention. In this case, data for appliance 10 is received directly from server 14 rather than local computer 12. From the appliance owner's perspective, the appliance programming interface is otherwise identical to the previously described embodiments. Communication between server 14 and appliance 10 may be telephonic. Appliance 10 may incorporate a conventional modem, in which case communications may be two-way, or may simply have a data demodulator for one-way communications. Coupling of appliance 10 to the telecommunications network may be by a conventional RJ-11 connection. Alternatively, appliance 10 may incorporate a cordless telephone module for communicating with a separate base station. Communications between server 14 and appliance 10 could also be implemented with radio signals. For example, appliance 10 could incorporate a conventional paging receiver.

A particular example of the embodiment illustrated in FIG. 3 is a programmable telephone. Speed dial numbers and other programmable features of a telephone may be conveniently set using a graphical user interface hosted by server 14. Once the features have been programmed by the user, server 14 simply places a call to the telephone. Appropriate data demodulation circuitry is incorporated in the telephone in order to download the data from server 14.

Figure 6:
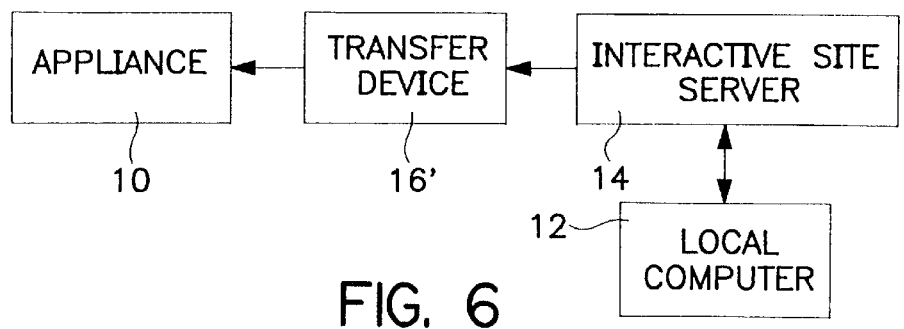
FIG. 6 is a functional block diagram of a fourth embodiment of the invention wherein an appliance receives data from an interactive site server via a transfer device.

FIG. 6 illustrates a further embodiment of the invention generally similar to that of FIG. 5, but incorporating a transfer device as in the embodiment of FIG. 2. Here, however, transfer device 16' receives data directly from server 14. As with the previously described embodiment, communication between server 14 and transfer device 16' may be telephonic or by radio. One example of a transfer device 16' is embodied as a removable module or "card" of a telephone. Data for an appliance 10 is downloaded from server 14 to the telephone where it is demodulated and stored in the card. The card may then be taken to appliance 10 to transfer the data to the appliance with an infrared or other data link.

Another embodiment of the invention as illustrated in FIG. 6 is a "universal" remote controller that may be coupled to a telecommunications network by means of an RJ-11 jack or equivalent in the manner disclosed by Darbee in U.S. Pat. No. 5,228,077. The remote controller could thus function as a data transfer device in addition to its more conventional remote control functions.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A method for setting programmable features of an appliance comprising the steps of:

providing an interactive site on a global computer network;

providing a graphical user interface at the interactive site, said graphical user interface having a virtual appliance that graphically depicts programmable features of a corresponding real appliance;

establishing a connection between a user's computer and the interactive site;

entering data with the user's computer to set programmable features of the virtual appliance at the interactive site;

providing a portable transfer device separate from the user's computer having an optical sensor and an output port;

downloading the appliance set-up data from the interactive site to the user's computer;

modulating at least a portion of a display coupled to the user's computer;

sensing the modulation with the optical sensor of the transfer device so as to receive the appliance set-up data;

downloading the appliance set-up data from the output port of the transfer device to the real appliance, wherein the real appliance is in a location remote from the user's computer.

2. The method of claim 1 wherein the output port of the transfer device comprises an infra-red transmitter.

3. The method of claim 1 further comprising the step of creating a record of the set-up data.

4. The method of claim 1 further comprising the step, prior to the step of setting programmable features, of entering a serial number of the real appliance.

5. The method of claim 1 farther comprising the steps of extracting information from the set-up data and sending said information to a manufacturer of the real appliance.

6. The method of claim 1 wherein the output port of the transfer device comprises electrical contacts for mating engagement with a docking port of the real appliance.

7. The method of claim 1 wherein the interactive site is accessed via the World Wide Web.

* * * * *